United States Patent [19]

Owen et al.

[11] 3,839,218

[45] *Oct. 1, 1974

[54] METHOD OF MAINTAINING METAL DITHIONITE HYDRATE CRYSTALS IN DISPERSIBLE FORM

[75] Inventors: Robert M. Owen, Levittown; Henry L. Ramm, Newtown, both of Pa.

[73] Assignee: Rohm and Haas Company, Philadelphia, Pa.

[ * ] Notice: The portion of the term of this patent subsequent to Oct. 1, 1991, has been disclaimed.

[22] Filed: Mar. 11, 1970

[21] Appl. No.: 18,742

Related U.S. Application Data

[63] Continuation-in-part of Ser. No. 1,835, Jan. 9, 1970.

[52] U.S. Cl............................ 252/188, 8/37, 8/107, 423/515
[51] Int. Cl. ....................... C01b 17/98, D21c 9/10
[58] Field of Search ............ 252/188; 8/34, 37, 107; 423/515

[56] References Cited
UNITED STATES PATENTS

| 795,755 | 7/1905 | Bazlen | 23/116 |
| 861,014 | 7/1907 | Bazlen | 23/116 |
| 2,995,522 | 8/1961 | Joyce | 252/188 |
| 3,054,658 | 9/1962 | Franklin et al. | 252/188 |
| 3,259,457 | 7/1966 | Sauls et al. | 252/188 |
| 3,265,459 | 8/1966 | Schaber et al. | 8/34 |

FOREIGN PATENTS OR APPLICATIONS

| 7,397 | 1904 | Great Britain | 23/116 |

OTHER PUBLICATIONS

Diserens, Chemical Technology of Dyeing and Printing, 1948, Reinhold, pp. 33–39.

*Primary Examiner*—Carl D. Quarforth
*Assistant Examiner*—Irwin Gluck

[57] ABSTRACT

Water soluble metal dithionites (often called hydrosulfites or hyposulfites) are valuable reducing agents for many chemical reactions such as textile dyeing, but the material must be either anhydrous and stored under an inert vapor, or supplied as an aqueous solution, in which case the material has limited stability in that the active material spontaneously decomposes in a short period of time, although the useful life of such solutions may be prolonged by refrigeration. If the crystals in the form in which they are precipitated are allowed to stand in the supernatant mother liquor, they eventually form a hard, concrete-like cake.

The present invention provides a method of maintaining a dispersion of crystalline zinc or alkali metal dithionite hydrate in dispersed form by continuous or periodic mechanical agitation, the crystals being capable of storage for long periods without decomposition. The dispersing medium may be aqueous or nonaqueous and contains a material which suppresses dissolution of the dithionite solids.

3 Claims, No Drawings

METHOD OF MAINTAINING METAL DITHIONITE HYDRATE CRYSTALS IN DISPERSIBLE FORM

This application is a continuation-in-part of application Ser. No. 1,835, filed Jan. 9, 1970.

The invention provides zinc or alkali metal dithionites or hydrosulfites in crystalline form as a pourable dispersion in a liquid. In accordance with a specific aspect of the invention of parent application Ser. No. 1,835, the dispersion may be stored for long periods of time in a quiescent state without decomposition thereof. According to the present invention, pourability is maintained by physical agitation.

The metal dithionites are valuable reducing agents finding utility in many chemical reactions such as the vat dyeing of textiles.

The metal dithionites, sodium dithionite ($Na_2S_2O_4$) in particular, are prepared by precipitating the compounds from concentrated aqueous solutions thereof by "salting out" techniques using an organic compound such as methanol or ethanol in which the crystals are insoluble and a salt of an acid, particularly an inorganic acid, such as sodium chloride or sodium sulfate to achieve the object of recovering a solid product. Suitable methods of obtaining the crystals are described in U.S. Pat. Nos. 2,938,771 and 3,004,825. The conditions are controlled so as to grow an elongated crystal of a size which can be readily separated from the mother liquor by sedimentation or filtration.

Common average crystal sizes, which are grown for ease of separation, are crystals at least 320 microns long by at least 120 microns in thickness, a smaller proportion of larger and smaller particles being present. If allowed to settle in an aqueous sodium chloride brine containing ethanol or methanol to give a heterogeneous system, the crystal cake under the supernatant liquid is quite dense and hard packed and is not fluent; it even solidifies to a form resembling concrete, in time. Although the brine-alcohol supernatant liquid protects the cake from decomposition, the intractible sediment or filter cake is not a useful form of the product. Because aqueous solutions of the dithionite soon decompose and do not provide an economical way to ship the material, it has been common to dehydrate the sodium dithionite dihydrate crystals to obtain the anhydrous particles. When stored under a dry, inert gas, the anhydrous crystals are chemically stable for long periods. However, to use the material, the opening of the container exposes the contents to air and moisture, causing losses. Large quantities of aqueous solution cannot be made up for use over a long period of time because once decomposition starts, it proceeds rapidly by self-propagation (the decomposition products give an acid pH, which accelerates the decomposition).

Parent application Ser. No. 1,835 teaches that by reducing the particle size of the crystals and/or introducing a suspending or thickening agent into a liquid, such as alcoholic brine, containing the crystals, it is possible to form a fluent, homogeneous, pourable dispersion of the solid dithionite particles, which is chemically and physically stable for long periods of time. It is essential in the present invention that a material such as the salt in the brine and/or an alcohol be present which suppresses the dissolution of the dithionite.

The particle size of the dispersed solid dithionite is not critical in the present invention. Thus, the average particle size can range from several microns to more than 500 microns. When an "average" particle size is referred to, the meaning intended is that the bulk of the particles are of approximately the specified size. As is well known, when crystals are precipitated or grown in bulk, there is normally a material variation in crystal size. The deviation from the average is inherent with a given crystal, temperature, etc.; accordingly, when an "average" size is referred to, it is intended that the inherent deviation be included.

The liquid suspending medium for the dithionite solids is preferably largely aqueous, the proportion of water therein being related to the nature and quantity of the suppressant of dissolution of the dithionite hydrate crystals or disintegrated crystals in the liquid. The material which suppresses dissolution of the dithionite particles may be a water soluble or miscible organic material, solid or liquid, or a water soluble inorganic compound, or both. Substantially any organic material which is a nonsolvent for the dithionite compounds and does not react therewith or catalyze the decomposition thereof is useful. Water miscible dissolution suppressants are preferred, but if the reducing compound is to be used in a nonaqueous environment, a water insoluble organic material such as the paraffinic or aromatic hydrocarbons, suitably thickened or diluted so as to be flowable, are useful. In this case, no salt suppressant of solubility need be used. The preferred liquid medium contains about equal amounts of water and methanol or ethanol, and about 10 to 20 percent of sodium chloride by weight.

Examples of water soluble or substantially soluble organic compounds for suppressing dissolution of the dithionite are alkanols or polyols such as methanol, ethanol, propanol, ethylene glycol, propylene glycol, glycerine, isopropanol, water soluble ketones such as acetone, methyl ethyl ketone, and "Cellosolve" ethers such as methyl "Cellosolve" or any other organic suppressant including water soluble alkyl amines such as $C_{1-4}$ alkyl amines including triethylamine, which can also be used to modify the pH, and formamides and sulfoxides such as dimethyl sulfoxide and dimethyl formamide or any other liquid having a solubility in water or saturated brine of at least about 10 parts per 100 parts of water or brine by weight. The organic compound need not be a liquid at room temperature; soluble organic compounds which are ordinarily solids such as glucose, sucrose, polysaccharides, exemplary of which is methyl cellulose, are useful as the inhibitor of dissolution of the solid dithionite. It is a simple matter to select useful organic compounds, the criteria being (1) inertness of the compound with respect to the dithionite, (2) the organic compound is a nonsolvent for zinc or sodium or other alkali metal dithionite, particularly the dihydrate thereof, and (3) it suppresses the dissolution of the particles in the liquid medium. One other criteria is of some importance, and that is the permeability of the liquid as to oxygen from the air; the lower the permeability the better. This does not mean that liquids having relatively high oxygen permeabilities are not useful, it simply means that they are less preferred embodiments of the invention. A thin layer of liquid such as kerosene, toluene, or the like may be maintained over the dispersion as an oxygen barrier in accordance with another aspect of the invention. Also, an inert gas atmosphere, such as nitrogen, may be used to displace air in the container. Even greater stability is possible with refrigeration, although it is not needed as with the solution form of the dithionites.

Similar criteria are applicable to the salt which functions to suppress dissolution of the solid dithionite hydrate. Its solubility in water should desirably exceed the solubility of the dithionite, it should be nonreactive therewith, and it must perform the salting out function. Since acids catalyze or otherwise induce decomposition of alkali metal dithionites, the salt obviously should give neutral or alkaline solutions; sodium bisulfite, one of the decomposition products of sodium dithionite, gives an acid reaction and is thus not useful, unless means to counteract its acid reaction is used. Any water soluble salt of any heavy metal, particularly those metals the sulfate of which is water soluble, or any water soluble salt of a metal of Group I or Group II of the periodic table or of ammonia is useful. Examples are sodium chloride, sodium bromide, the more soluble forms of sodium sulfate and sodium phosphate, sodium silicate, zinc sulfate, copper sulfate, ferrous sulfate, sodium acetate, sodium lactate, and ammonium chloride. Commonly sodium sulfite is present in solution and in the solids as a byproduct. The aqueous liquid most desirably should be saturated with respect to the salt used.

Of course, the end utility of the zinc of alkali metal dithionite must be kept in mind. Thus, the various components are selected so that they are compatible with the desired end procedure involved, such as dyeing or bleaching. It is important to subject each component to the simple screening tests noted above, i.e., to apply the criteria for selection of the components in the event there is doubt as to the usefulness of a given material.

While thickening and suspending agents are not needed, they can be used. The thickening and suspending agent is chosen for its suspending properties, fluidity at the temperatures encountered in shipping, storing, and using the suspension, inertness with respect to the dithionite, and in some cases its effect in suppressing dissolution of the dithionite. Useful thickening and suspending agents are well known to those skilled in the art. Polysaccharides, chemically modified polysaccharides, water soluble polymers, proteins of moderate molecular weight, which are water soluble or dispersible and have thickening properties are useful. Examples are the soluble cellulose ethers and polysaccharide gums such as carboxymethyl cellulose, methylhydroxypropyl cellulose, ethylhydroxyethyl cellulose, methyl cellulose, hydroxyethyl cellulose, hydroxypropyl cellulose, agar-agar, guar gum, mannogalactose, sodium alginate, gum tragacanth, gelatin, starch, hydroxyalkylated starch, polyvinyl alcohol and esters and ethers thereof, the soluble salts of polyacrylic acid, polymethacrylic acid, or polyitaconic acid, gelatin, bentonite and other colloidal clays, and so on. The end use must be kept in mind here too, the temperature having an effect on the viscosities of solutions of these materials. Because of the use of continuous or periodic agitation in the present invention, if a suspending agent is used, the amount is below that at which a stable suspension is obtained.

The viscosity of the mechanically maintained suspension according to the present invention is below that at which a stable suspension of solids is obtained; i.e., a suspension that remains flowable for long periods without agitation. At times, a very thin layer of supernatant liquid may separate from the still flowable suspension. This is not detrimental, and in fact it may be an advantage in that it provides a barrier to oxygen penetration and consequent product degradation.

As has been indicated above, the flowable dispersion should have a pH at least substantially neutral and preferably on the alkaline side. By a substantially neutral pH is meant from about 6.5 to 7. The pH of any aqueous medium present desirably should be from 7 to 14, and preferably at about 9 or above. Suitable alkaline materials to achieve the desired pH include alkali metal and ammonium hydroxides and carbonates, in particular sodium hydroxide and sodium carbonate, and water soluble amines. Suitable known buffers to maintain an alkaline pH are useful.

In storing and shipping the dispersion, it is best to avoid situations in which air is constantly circulated over an exposed surface of the dispersion. The container should be as full as is practicable. Tank cars should be sealed with only safety vents open. As is suggested above, a floating liquid layer to inhibit the penetration of air can be used; even materials relatively permeable to oxygen, such as toluene, being of use. Other advantageous procedures include the use of an inert gas such as nitrogen under superatmospheric pressure to discharge the vessels.

The invention provides substantial advantages over the prior art compositions of either an aqueous solution of the dithionite or anhydrous crystals thereof. The solution, being less concentrated, costs more to ship, and commonly requires the use of chemical stabilizers, such as those taught by U.S. Pat. Nos. 3,054,658 and 3,287,276, an inert atmosphere, and most importantly, refrigeration, to maintain even short term stability. The present invention thus provides a conveniently utilizable form of alakli metal dithionite, and gives savings in manufacturing, shipping, and storing costs, as well as in reduced costs because of a major reduction in losses due to decomposition. It is less expensive to prepare than the stabilized slurry of parent application Ser. No. 1,835 because the crystal size is not critical, and expensive suspending agents are not necessary.

The following examples provide a description of the best modes presently contemplated of carrying out the invention. Unless otherwise stated, the dispersions are stored at about 20°C.

EXAMPLE 1

Freshly prepared sodium dithionite dihydrate crystals in a brine consisting of a saturated sodium chloride solution in equal parts of water and ethanol and an alkaline material to give a pH of 8.0, and having an average size of 175 × 50 microns are introduced into a covered container having an impeller type of agitator. The mixture is stirred continuously at a rate to keep the crystals in suspension. The container, prior to use of the crystals, is substantially completely filled with little or no air space. Alternatively the air can be displaced by an inert gas such as nitrogen.

EXAMPLE 2

Repeating Example 1 with potassium dithionite dihydrate gives similar results.

EXAMPLE 3

Using zinc dithionite hydrate in place of the sodium salt of Example 1 gives a similar product.

EXAMPLE 4

Example 1 is repeated, but the crystal-liquid mixture is conveyed to the point of use by a tank car having a circulating pump to maintain the crystals in suspension.

EXAMPLE 5

Example 4 is repeated, but agitation is maintained periodically to prevent the crystals from caking and maintain them in resuspendable form.

EXAMPLE 6

Example 4 is repeated, but a cement mixer type of agitating means is used.

We claim:

1. In a method of storing and shipping zinc or alkali metal dithionite hydrate, the improvement of suspending finely divided particles thereof in a liquid which does not react therewith or catalyze the decomposition thereof, comprising a material which suppresses the dissolution of the particles in the liquid, the material being inert with respect to the dithionite and a nonsolvent therefor, the amount of said material being sufficient to prevent dissolution of said particles, the pH of the liquid being at least 6.5, and maintaining said particles in suspended or resuspendable form during storage and shipment thereof by means of mechanical agitation, the viscosity of said dispersion being below about 50,000 centipoises.

2. The method of claim 1 in which said liquid is water containing an alkanol and an alkali metal or ammonium salt of an inorganic acid.

3. The method of claim 2 in which the pH is at least 9.

* * * * *